United States Patent [19]

Kiunke et al.

[11] Patent Number: 5,368,271
[45] Date of Patent: Nov. 29, 1994

[54] GIMBAL VIBRATION ISOLATION SYSTEM

[75] Inventors: Paul C. Kiunke, Long Beach; Robert D. Schaefer, Huntington Beach, both of Calif.

[73] Assignee: Hughes Aircraft Company, Los Angeles, Calif.

[21] Appl. No.: 844,033

[22] Filed: Mar. 2, 1992

[51] Int. Cl.[5] .................... F16F 15/04; G03B 17/56
[52] U.S. Cl. .................... 248/638; 248/181; 248/187
[58] Field of Search ............... 248/178, 179, 180, 181, 248/182, 183, 186, 187, 638

[56] References Cited

U.S. PATENT DOCUMENTS

| | | | |
|---|---|---|---|
| 3,703,999 | 11/1972 | Forys et al. | 248/638 X |
| 4,101,102 | 7/1978 | Lloyd | 248/638 |
| 4,783,038 | 11/1988 | Gilbert et al. | 248/638 X |
| 5,204,573 | 4/1993 | Bederson et al. | 248/183 X |

Primary Examiner—Richard K. Seidel
Assistant Examiner—Raymond D. Woods
Attorney, Agent, or Firm—Hugh P. Gortler; M. W. Sales; W. K. Denson-Low

[57] ABSTRACT

A gimbal vibration isolation system suitable for use with an inertial platform to enable accurate positioning of the platform independently of a presence of vibratory translational movement upon a gimbal housing enclosing the platform employs a frame assembly centrally located within platform for pivoting the platform and for isolating the platform from vibration. The gimbal housing includes a drive ring rotatable about a central axis and encircling the frame assembly which is connected to the drive ring. A central portion of the frame assembly carries a pivot which pivotally supports the platform. An electromagnetic actuator is located at each of a plurality of positions located circumferentially around the central axis wherein each actuator has a first part connecting with the frame and a second part connecting with of the platform to accomplish a pivoting between platform and frame assembly upon activation of each actuator. The frame assembly further includes a plurality of vibration isolation elements of resilient material disposed symmetrically about the central axis and being connected between the first parts of respective ones of the actuators and the drive ring to allow operation of the actuators in an environment substantially free of translatory vibrational movement.

11 Claims, 7 Drawing Sheets 5,368,271

GIMBAL VIBRATION ISOLATION SYSTEM

This invention was made with Government support under Contract DAAJ 09-89-C-A001 awarded by the Department of the Army. The government has certain rights in this Invention.

BACKGROUND OF THE INVENTION

This invention relates to stable platform systems and, more particularly, to apparatus incorporated within a gimbal structure for isolating a payload platform, such as an initial stabilized platform, from linear laboratory motion without introducing a torque to the platform.

Platforms which are stabilized from rolling, pitching and yawing movements of a vehicle or other object, (including a person,) supporting the platform are employed for a variety of purposes. One such purpose is stabilizing a sighting device useful in the control of a vehicular camera, such as an optical or infrared camera or vidicon. Typically, the gyroscope, which may be a laser gyro, is mounted on the stabilized platform to sense rotational movements of the vehicle, the gyroscope being operative with a closed-loop stabilization system for supplying corrective torquing signals to actuators and/or drive motors for reorienting the platform by a known amount of angular increment in each of the three coordinates: roll, pitch and yaw.

It has been found that in the implementation of the stabilization system, the presence of linear, or translational, vibratory motion of the vehicle tends to limit the maximum accuracy which is obtainable for correction of the platform attitude in response to rotational movements of the vehicle. Attempts have been made to correct this situation by introducing shock mounts or resilient members within a gimbal structure supporting the platform. However, such vibration isolation apparatus may be off-centered relative to a plane containing a pivot axis of the gimbal structure so as to introduce an undesired torque from the translational movement, particularly a translational acceleration.

A further problem with vibration isolation apparatus occurs in the development of suitable actuators for torquing the platform in conjunction with operation of the isolation device, such as a shock absorber, spring, or other form of resilient material. In some cases, the actuators have been required to be excessively long to accommodate a stroke length of the vibration isolator, or have been required to have an excessively wide gap because of a requirement for operation across the isolation apparatus between the payload and a coarse support of the gimbal structure. Such constraints on the construction of the actuators produce actuators which are heavier than desired, and require more power than is desired. For example, a wide-gap electromagnetic actuator is less efficient than a narrow-gap electromagnetic actuator due to a lengthened flux path and requisite higher coil current to obtain the desired actuator movement.

SUMMARY OF THE INVENTION

The aforementioned problems are overcome and other advantages are provided by incorporating vibration isolation apparatus in a stabilized gimbal system, in accordance with the invention, by locating vibration isolation elements within the gimbal system so as to avoid introduction of unwanted torque resulting from vibration inputs.

In accordance with a feature of the invention, both the actuators and the vibration isolation elements, or isolators, are mounted in a plane of a gimbal ring with actuators and vibration isolation elements being arranged with radial symmetry about a center of the gimbal ring. In accordance with a further feature of the invention, the stabilized platform is constructed of two parallel plate assemblies which are fixed in a spaced-apart attitude in a sandwiched arrangement with the plane containing the actuators and the vibration isolators. The actuators and the vibration isolators are mounted between the two parallel plate assemblies of the stabilized platform and form a part of a gimbal-cross frame positioned between the two parallel plate assemblies. At an outer periphery of the gimbal-cross frame, the frame engages with a cross elevation gimbal by means of a ball bearing assembly. At a central point of the frame, there is located a pivot assembly which joins the gimbal-cross frame to the two parallel plate assemblies of the stabilized platform. A first part of each actuator is mounted to the gimbal-cross frame, and a second part of each actuator is movable relative to the first actuator part and is mounted to both of the parallel plate assemblies of the stabilized platform. The cross-elevation gimbal, in turn, is mounted via a housing and a cross-elevation drive to a superstructure of the vehicle enabling positioning of the stabilized platform in both cross azimuth and cross elevation.

The arrangement of the actuators and the vibration isolators in a con, non plane between the two plate assemblies of the stabilized platform allows for minimization of the physical sizes of the actuators for reduction of weight and increased efficiency of operation while providing for isolation from translatory movements of the vehicle without introduction of torque from the translatory movements. In a preferred embodiment of the invention, four of the actuators are employed and are arranged symmetrically on circumferential direction about the gimbal-cross frame. In addition, each of the actuators is formed as a cross-coil type of actuator with movement in one or both of two orthogonal directions perpendicular to the radial directions. By actuation of the actuators on a first diameter of a gimbal ring of the gimbal-cross frame in concert with actuation of the actuators on a second diameter, perpendicular to the first diameter, the cross coil configuration of the actuators enables corrective movements of the stabilized platform in all three directions of roll, pitch, and yaw. The stabilized platform carries a laser gyro and associated optical collimation devices in conjunction with associated electronic equipment.

BRIEF DESCRIPTION OF THE DRAWING

The aforementioned aspects and other features of the invention are explained in the following description, taken in connection with the accompanying drawing, wherein.

DETAILED DESCRIPTION

Figure 1:
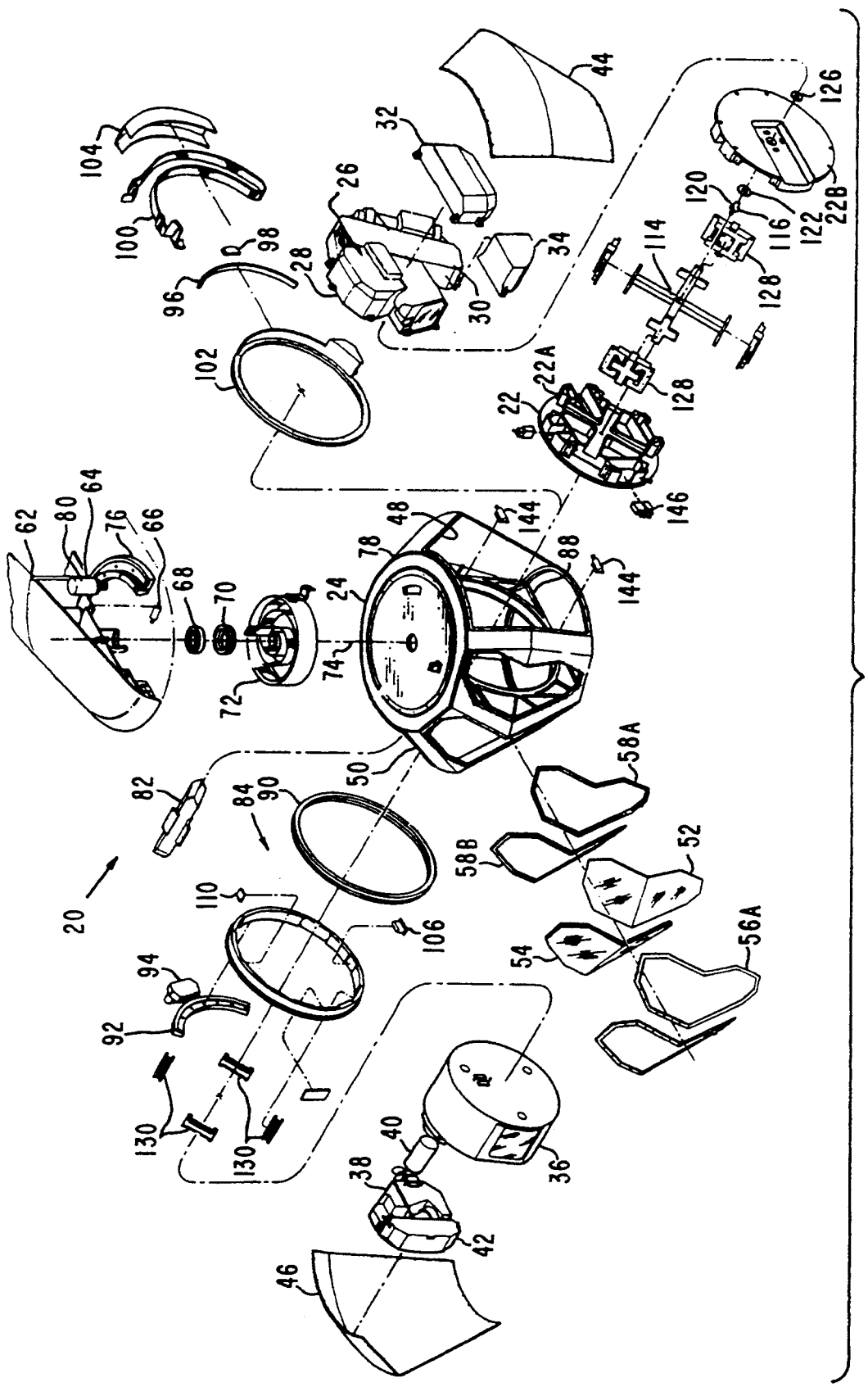
FIG. 1 shows a stylized and partly diagrammatic view of a stabilized gimbal system employing a vibration isolation system constructed in accordance with the invention, the view being exploded and showing some components of the stabilized gimbal system in simplified fashion to facilitate visualization of the stabilized gimbal system and the location therein of the components of the vibration isolation system.

The gimbal vibration isolation system of the invention is described readily by considering the construction of a stabilized gimbal system having a platform suitable for a mounting of optical apparatus such as an infrared camera, or telescope or television vidicon operative in the visible portion of the electromagnetic spectrum. The stabilized gimbal system includes a housing which encloses and supports the platform. The platform is stabilized in three directions of rotation, namely, pitch, roll and yaw. Stabilization of the platform isolates the foregoing optical apparatus from vibratory and shock rotational movements of a vehicle carrying the apparatus, and the use of vibration isolation elements isolates the platform from linear vibratory and shock movements for improved accuracy in the use of the optical apparatus. Coarse stabilization is provided by a coarse azimuth gyro and a coarse elevation gyro connected mechanically to coarse azimuth and coarse elevation motorized rotational units for imparting angular correctional movement to the platform to compensate for angular movement of the housing. Typically, the housing is supported within a vehicle which may be land, sea or aircraft. In addition, in a preferred embodiment of the invention, there is provided also a fine stabilization of the platform by means of a set of three gyros connected mechanically to the stabilized platform, and operatively coupled via servo feedback loops with mechanical actuators to provide a fine correctional movement to the platform in the three coordinate rotational directions of roll, pitch and yaw. The fine stabilization corrects for vibratory rotational movements of the housing.

In accordance with a feature of the invention, vibration isolation elements are positioned between the platform housing at the location of the coarse elevation gimbal in a serial arrangement with actuators between gimbal and platform. The vibration isolation elements attenuate high frequency components of the vibratory movement, including any shocks which may be transmitted from vehicle to housing, so as to enable the fine positioning servo feedback loops to develop accurately the requisite correctional movements for stabilizing the platform. As will be described in further detail hereinafter, the positioning of the vibration isolation elements, or isolators, enables the absorption and attenuation of linear vibratory movement of the housing without converting this movement into rotary movement of the platform, thereby to enhance the accurate stabilization of the platform.

In order to describe the details in the construction of the isolators and the actuators, and their locations in relation to other components of the stabilized gimbal system, it is advantageous to describe first the general layout of the components of the stabilized gimbal system, this being followed by a description of the isolators and the actuators.

With reference to FIGS. 1-4, a stabilized gimbal system 20 comprises a stabilized optical bench or platform 22 of bipartite construction having a first plate assembly 22A and a second plate assembly 22B. The platform 22 is supported within a housing 24 of the system 20. The platform 22 supports various optical and image forming equipment which, by way of example, includes a TV (television) image assembly 26, a visible telescope assembly 28, a laser 30, an electronics unit 32. These component which cooperate to provide images of a distant target or subject, are located on the second plate assembly 22B. Also supported on the second plate assembly 22B is an inertial measurement unit 34 which includes gyroscopes (not shown) oriented along the three coordinate rotational axes, the inertial measurement unit 34 serving to position the platform 22 about the fine gimbal assembly. Further components located on the first plate assembly 22A are, by way of example, an infrared (IR) telescope assembly 36, an IR image assembly 38, a cryostat 40 for cooling the detector of the telescope assembly 36, and a second electronics unit 42, which components cooperate to form imaging data of a target or subject.

The housing 24 is closed off from the outside environment by a left cover 44 and a right cover 46 which close off access ports 48 and 50 of the housing 24. The ports 48 and 50 allow insertion of the plate assemblies 22A and 22B and various components, to be described hereinafter, for assembly of the system 20. Two further ports of the housing 24 are closed off by a TV/laser window 52 and a forward-looking infrared (FLIR) window 54 which are secured to the housing 24 respectively by window frames 56A-B and insulating seals 58A-B. The windows 52 and 54 permit an observer to view, from a location outside the housing 24, images produced by the aforementioned electrooptic imaging equipment carried by the platform 22.

The system 20 includes an azimuthal drive assembly 60 which mechanically interconnects the housing 24 with a superstructure of a vehicle carrying the system 20, such as an aircraft interface structure 62. The azimuthal drive assembly 60 comprises a coarse azimuthal (AZ) drive 64, a coarse AZ shock absorber 66, and a coarse AZ resolver 68 disposed on a bearing 70 and having electric wiring including an AZ cable wrap 72. The resolver 68, the bearing 70 and the cable wrap 72 are disposed coaxially about an azimuthal axis 74 shown vertically in FIG. 1. The coarse drive 64 has a circular rail 76 which is secured to a top 78 of the housing 24 to be driven rotationally by a motor 80 of the AZ drive 64 relative to the aircraft interface structure 62, the motor 80 connecting with the structure 62. In well-known fashion, signals of the resolver 68 provide data as to the orientation of the housing 24 relative to the structure 62, which data is employed by well-known electronic circuitry (not shown) for operating the motor 80 to bring the housing 24 to a desired azimuthal orientation relative to the aircraft interface structure 62. A shock absorber 66 connects between the interface structure 62 and the azimuth housing 24 to attenuate the shock of the azimuth gimbal being driven into the travel limit stop. A boresight retroscope 82 is secured within the housing 24 for alignment of the housing 24.

Coarse elevation motion of the platform 22 relative to the housing 24 is accomplished by a coarse elevation drive assembly 84 which comprises a coarse elevation (EL) shaft or ring 86 which rides upon a circular track 88 of the housing 24 by means of a coarse EL bearing 90 having the forth of a ring. The track 88 is disposed in a central plane of the housing, a diameter of the track 88 coinciding with the azimuthal axis 74. The elevation drive assembly 84 further comprises a sector gear 92 affixed to the ring 86 and driven by a coarse-elevation drive motor 94 to rotate about an axis of the circular track 88. An inductosyn 96 is mounted to the track 88 and an inductosyn slider 98 is mounted to the EL ring 86 for providing coarse elevation data which serves as a measure of the angular position of the ring 86 relative to the housing 24. Electric power for the EL drive motor 94 is provided by a cable wrap 100 enclosed by a bearing cable wrap retainer 102 and a cable wrap guide 104. Positioning of the coarse EL ring 86 is accomplished by means of a gyroscope assembly 106 carried by the ring 86. This assembly 106 includes both azimuth and elevation gyros to provide signals to both the azimuthal drive assembly 60 and the coarse elevation drive assembly 84 to rotate the housing 24 in azimuth and the ring 86 in coarse elevation, thereby to maintain a desired attitude of the platform 22 during movements of the vehicle carrying the gimbal system 20. Autocollimator mirrors 108 and 110 mounted to the ring 86 form part of an electro-optical system which cooperates with the coarse gyroscope assembly 106 to orient the platform 22 in azimuth and cross elevation by means of well-known collimation process.

Figure 5:
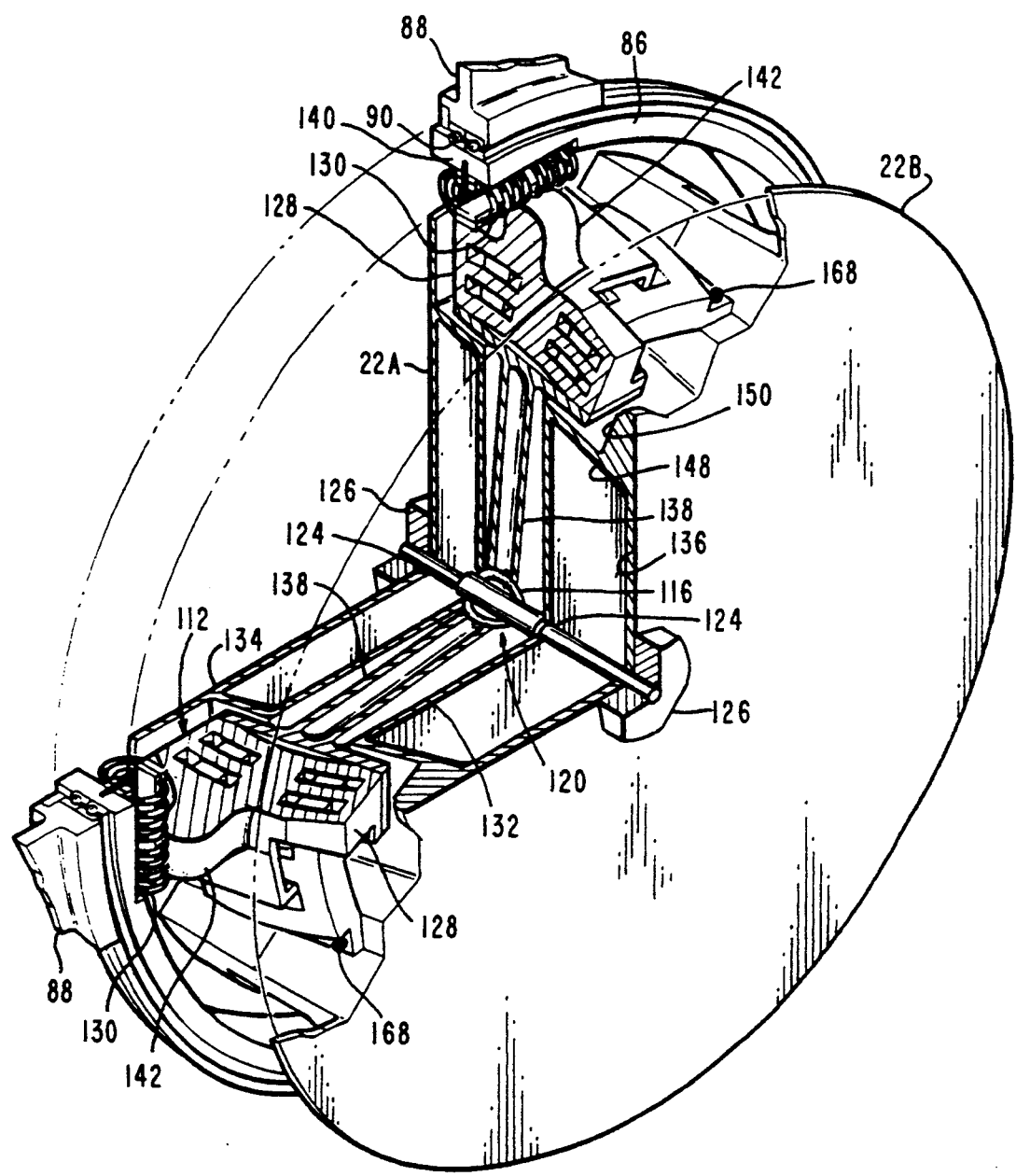
FIG. 5 is a perspective view, partly stylized, of a portion of the view of FIG. 1 showing a mounting of a bipartite platform to a coarse elevation gimbal by serial connections of rotational actuator and vibration isolation element, the view being partly cut away to disclose details of the construction.

FIG. 5 shows details in the construction of the platform 22, and shows also a supporting of the platform 22 by a frame assembly 112. The frame assembly 112 is centered between the first plate assembly 22A and the second plate assembly 22B of the platform 22. The frame assembly 112 includes a central frame 114 extending radially outward and symmetrically about a spherical ball bearing 116 of the fine gimbal, and has the configuration of a fine gimbal cross indicated also diagrammatically in FIGS. 1 and 2. As shown in FIG. 5, the ball bearing 116 serves as a pivot of a pivot assembly 118 which includes the bearing 116 and a shaft 120 extending from the bearing 116 to connect with both of the plate assemblies 22A-B of the platform 22. The bearing 116 is positioned relative to the plate assemblies 22A-B with the aid of a bearing retainer 122 (FIG. 1) disposed on the shaft 120. To provide for the connection of the plate assemblies 22A-B to the pivot assembly 118, the shaft 120 (FIG. 5) is constructed, by way of example, with a shoulder 124 on the left side of the bearing 116 (as viewed in FIG. 5) for abutment with the first plate assembly 22A, the shaft 120 having a second shoulder 124 on the right side of the bearing 116 for abutment with the second plate assembly 22B. Opposed ends of the shaft 120 are threaded to receive nuts 126 for securing the plates 22A-B in their positions on the shaft 120 on opposite sides of the bearing 116. Also included in the frame assembly 112 is a set of actuators 128 and a set of vibration isolation elements or isolators 130 which constitute an important part of the invention as will appear in the ensuing description.

By way of example in the construction of the platform 22, each of the plate assemblies 22A-B is constructed of spaced apart plates 132 and 134, which define a void 136 One plate 132 is positioned towards the bearing 116 on an interior side of each plate assembly 22A-B , and the other plate 134 is positioned on an outer side of each plate assembly 22A-B away from the bearing 116.

The central frame 114 is configured, in a preferred embodiment of the invention, of four branches 138, and four actuators 128. One actuator 128 is positioned at the outer end of each branch 138 of the frame 114. The branches 138 and the actuators 128 are distributed symmetrically about the shaft 120. The actuators 128 are shown only partially, and somewhat in simplified view, in FIG. 5, with further details to be described with reference to FIG. 6. As shown FIG. 5, each vibration isolator 130 is connected to a corresponding actuator 128. All of the vibration isolators 130 also connect with the coarse elevation ring 86, as by use of screws 140. In FIG. 5, each vibration isolator 130 is shown connected to the corresponding actuator 128 by means of a shim or pedestal 142, by way of example, it being understood that a vibration isolator 130 may be connected directly to the corresponding actuator 128 in an alternative manner.

Attenuation of shock due to the coarse elevation ring 86 striking the travel limits at maximum up or down look angles is provided by coarse EL shock absorbers 144 (FIG. 1) secured to the housing 24. The stop bracket is secured to the coarse elevation ring 86. The fine gimbal operation includes positioning by the four actuators 128 in the three coordinates of roll, pitch, and yaw with the aid of three autocollimators 146 (FIG. 1) which act in a feedback servo loop including the gyroscopes of the inertial measurement unit 34 (FIG. 1).

As shown in FIG. 5, the inner plate 132 of each of the platform plate assemblies 22A-B terminates in a shelf 148 which joins with the outer plate 134 in each of the plate assemblies 22A-B to form a recess 150 at the site of each of the actuators 128, thereby to provide space for accommodating the actuators 128 at their locations between the plate assemblies 22A-B. There is a spacing between the outer plates 134 which is sufficient to allow for relative motion between the actuators 128 and the platform 22. Also, the inner plates 134 are spaced apart from the branches 138 of the central frame 114 a sufficient distance to allow for relative motion between the platform 22 and the frame 114.

Figure 6:
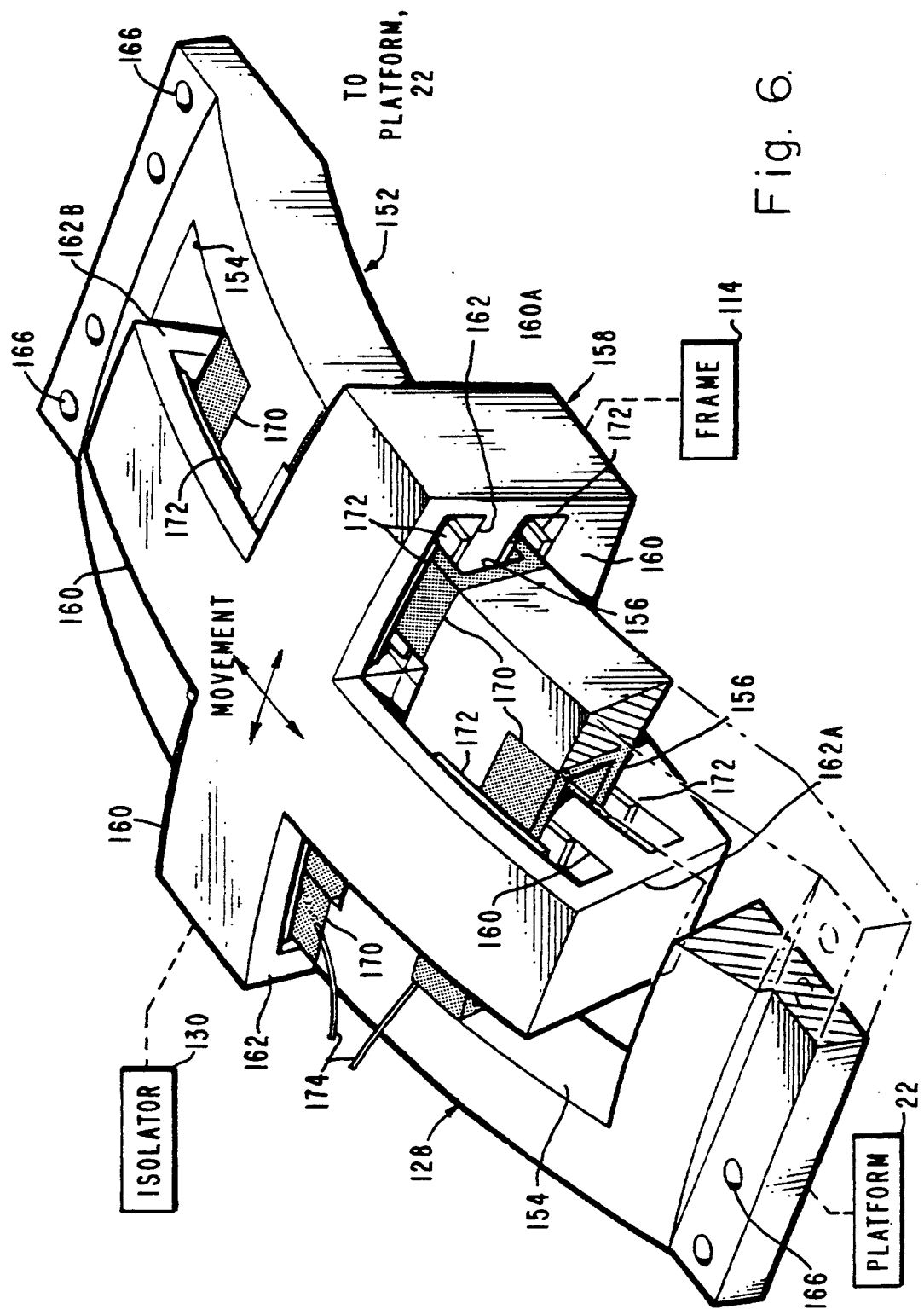
FIG. 6 is a perspective view, partially cut away, of an actuator of FIG. 5, connections of the actuator to the platform and to a frame and a vibration isolation element being indicated diagrammatically.

FIG. 6 shows details in the construction of one of the actuators 128. All of the actuators 128 have the same construction and, accordingly, the description of FIG. 6 applies to all of the actuators 128. The actuator 128 comprises a base 152 in the form of a lattice having three radially directed apertures 154 and four apertures 156 directed axially. The terms radial and axial are with reference to the structure of FIG. 5 wherein radial is radially outward from the shaft 120 and axial is in a direction perpendicular to the radius, such as circumferential around the shaft 120 or in a longitudinal direction parallel to the shaft 120. The actuator 128 further comprises a body 158 having three parallel sets of crossarms 160 joined together by legs 162 and a central post 164. The base 152 and the body 158 are fabricated of a dimensionally stable nonmagnetic material, such as aluminum or a rigid plastic. The radial apertures 154 are sufficiently large to allow passage therein of legs 162A-B and the post 164 in circumferential and longitudinal directions. The transverse apertures 156 are sufficiently large to allow passage therein of a central set of the crossarms 160A in the circumferential and longitudinal directions. The legs 162A-B pass through the outer two radial apertures 154 to join the three sets of crossarms 160, and the remaining two legs 162 pass exteriorly around the lattice 152 to join the three sets of the crossarms 160. All of the crossarms 160 connect with the central post 164 of the body 158. The configuration of the body 158 and the base 152, as just described, allows for independent movement of the lattice 152 relative to the body 158 in both transverse directions, namely, the longitudinal direction parallel to the shaft 120 of FIG. 5 and in the circumferential direction around the shaft 120.

The body 158 of the actuator 128 is secured rigidly between the frame 114 and the isolator 130 as shown in FIG. 5, and the base 152 of the actuator 128 is secured rigidly to the plate assemblies 22A-B the platform 22 as shown in FIG. 5. By way example in the connection of the base 152 to the platform 22, opposed ends of the base 152 may be provided with a set of holes 166 through which screws 168 (two of which are shown in FIG. 5) are threaded into the shelf 148 of each of the plate assemblies 22A-B. In the connection of the body 158 to the frame 114 and to the isolator 130, a branch 138 of the frame 114 contacts the center of an inner one of the sets of crossarms 160, in alignment with the central post 164, and, similarly, the isolator 130 is centered about an outer one of the sets of crossarms 160 in alignment with the central post 164.

In order to provide for movement between the body 158 and the base 152 relative to each other to attain a desired relative position between the body 158 and the base 152, the actuator 128 is provided with a plurality of electromagnets each of which comprises a coil 170 and a plurality of permanent magnets 172. Electric leads 174 provide electric current to the coils 170 for activating the actuator 128, the leads 174 being shown, by way of example, for two of the coils 170. The leads 174 connect, along with the autocollimators 146 (FIG. 1) with the inertial measurement movement unit (FIG. 1) for forming the feedback servo control loop by which the gyros of the inertial measurement unit 34 provide for fine control of orientation of the platform 22. The fine control of the platform, provided by inertial measurement unit 34 is in addition to coarse control provided by the azimuthal drive assembly 60 and the elevation drive assembly 84.

A particular inventive feature in the use of the actuators 128 is attained by placing the actuators 128 uniformly about the shaft 120 (FIG. 5), 90 degrees apart. The actuator 128 at the left side of FIG. 5 provides for both yaw and roll movement of the platform 22 relative to the central frame 114. An actuator 128 (not shown in FIG. 5) positioned diametrically opposite the foregoing actuator 128 aids in the yaw and roll positioning of the platform 22 relative to the frame 114. In a similar fashion, the actuator 128 at the top of FIG. 5, and a second actuator 128 (not shown in FIG. 5) diametrically opposite the foregoing actuator 128 serve to position the platform 22 relative to the central frame 114 in both roll and pitch. Thereby, the combination of all four of the actuators 128 provide for fine positioning of the platform 22 in all three coordinate axes of rotation.

Figure 2:
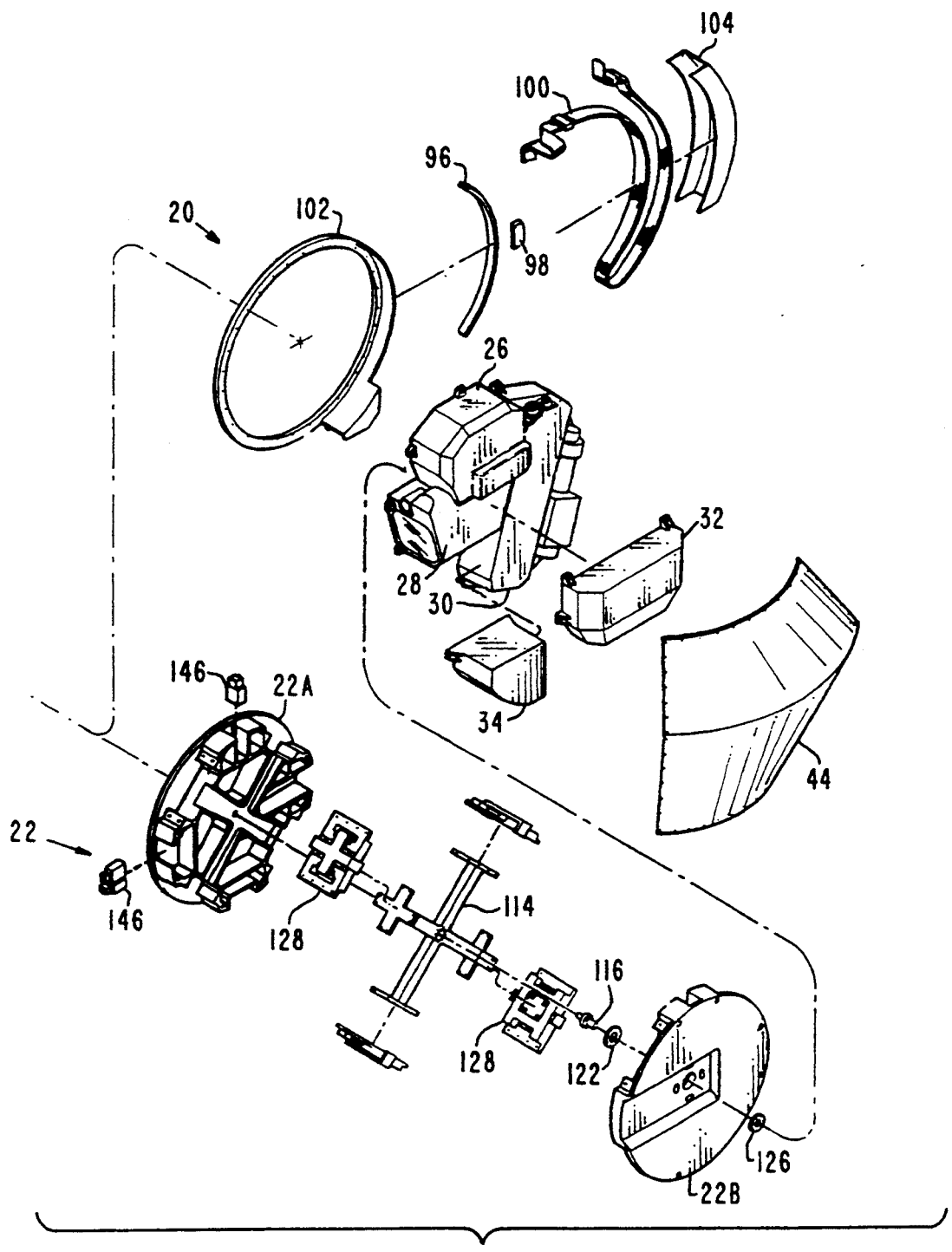
FIG. 2 is an enlarged view of a right side portion of the view of FIG. 1 showing components to the right of a centrally located housing.
Figure 3:
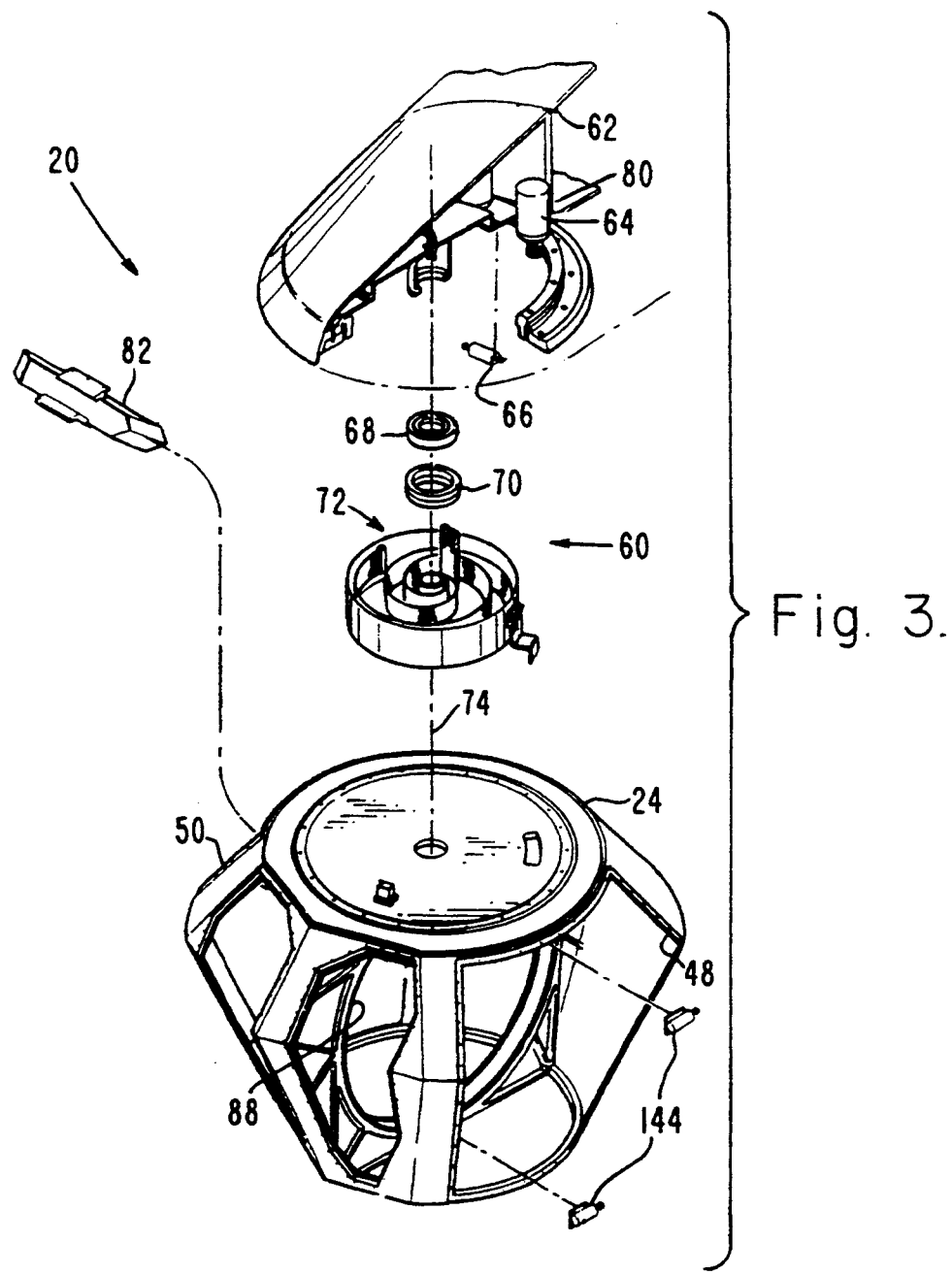
FIG. 3 is an enlarged view of a central portion of the view of FIG. 1 including the housing.
Figure 4:
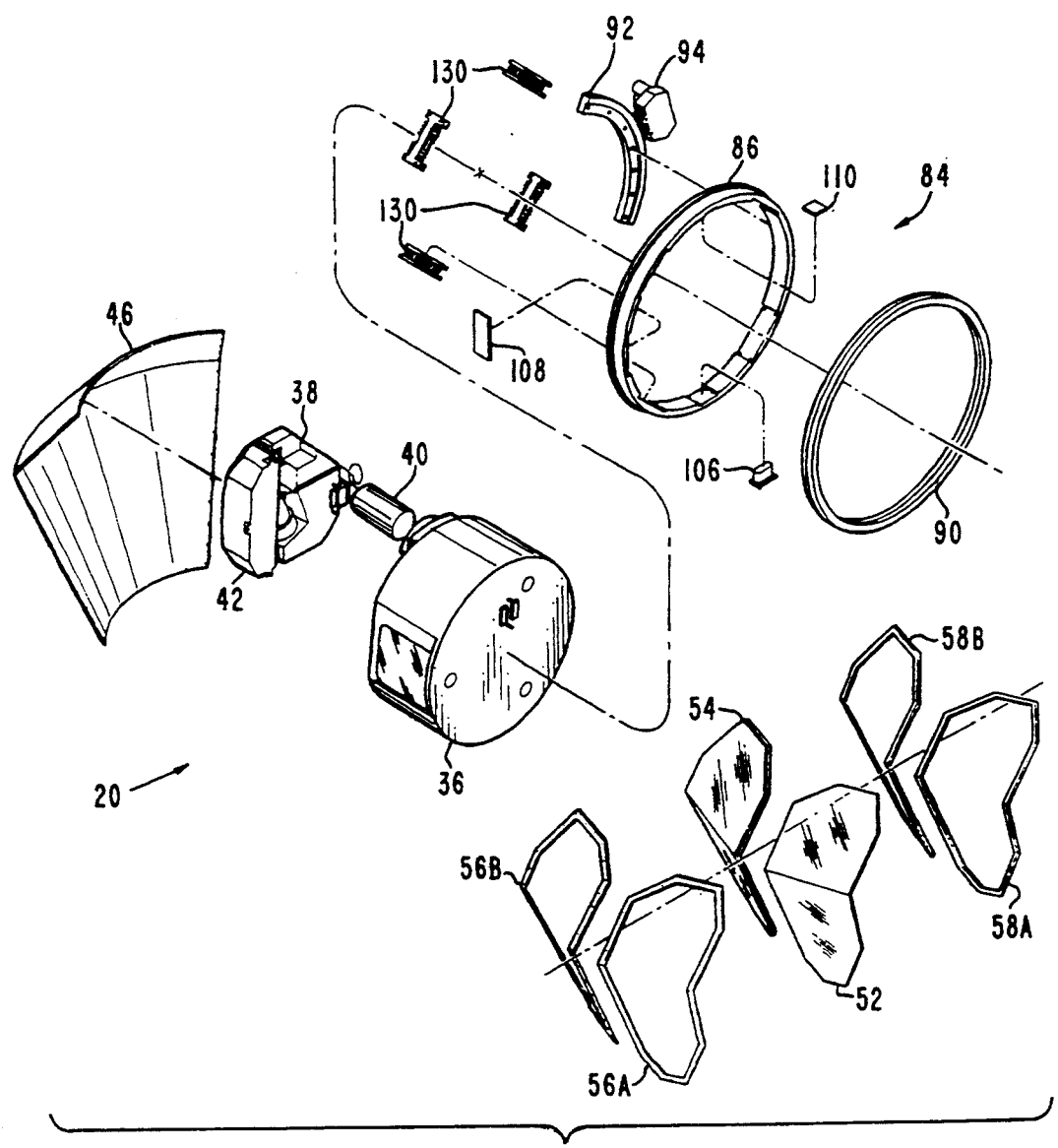
FIG. 4 is an enlarged view of a left side portion of the view of FIG. 1 showing components to the left of the housing.
Figure 7:
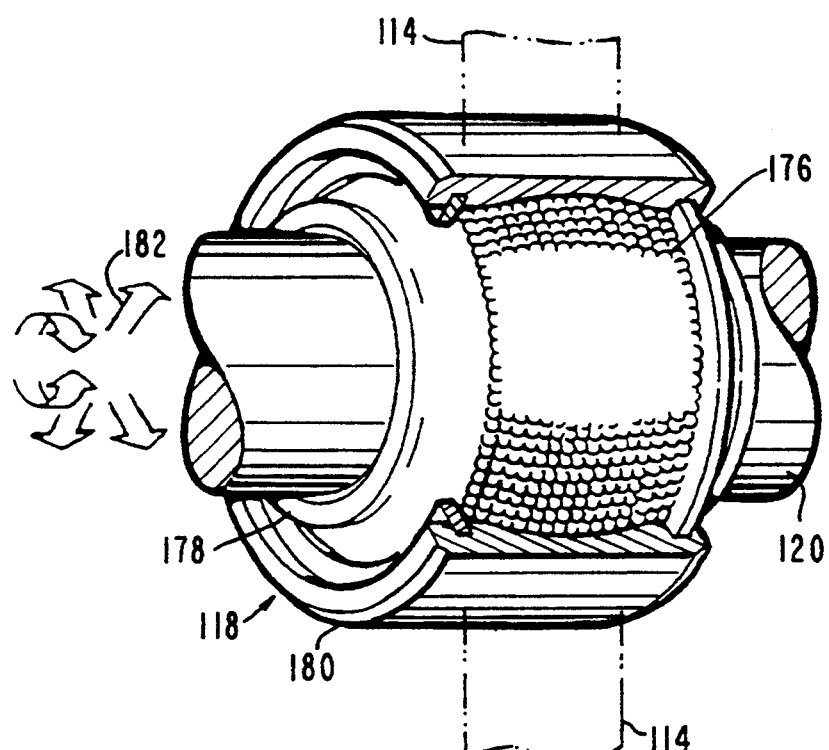
FIG. 7 is a perspective view of a spherical ball bearing of FIG. 5.

FIG. 7 shows details in the construction of the pivot assembly 118 of FIGS. 1 and 2. In FIG. 7, the spherical ball bearing 116 of the pivot assembly 118 comprises a set of balls 176 which roll between an inner race 178 and an outer race 180 disposed coaxially about an axis of the shaft 120. The inner race 178 is secured to the shaft 120, and the outer race 180 is secured to the central frame 114 of FIG. 5. The surfaces of the races 178 and 180 are spherical, and the balls 176 can roll along the surfaces in both a longitudinal direction, approximately parallel an axis of the shaft 120, and in the circumferential direction about the shaft 120 to allow for a rolling of the frame 114 about the axis 120 and for a pivoting of the frame 114 in both directions of pitch and yaw about the axis 120. These three directions of rotational movement are indicated by a set of arrow 182 shown to the left of the shaft 120 in FIG. 7.

In operation, and with reference to FIGS. 1 and 5, the coarse azimuthal drive assembly 60 and the coarse elevation drive assembly 84 orient the platform 22 with approximately a desired orientation for operation of the optical systems carried on board the platform 22. Thereby, telescopes and television cameras are maintained approximately on target independently of movement of a vehicle, such as an aircraft carrying the stabilized gimbal system 20. However, there are limitations in the precision and accuracy of the coarse azimuthal drive assembly 60 and the coarse elevation drive assembly 84 due to such factors as stiction (static friction) and vibration or shock movement of the vehicle which may introduce a torque which rotates the platform 22 away from a desired orientation. These limitations are corrected by the fine gimbal control provided by the arrangement of the actuators 128 and the vibration isolators 130 with respect to the platform 22. The bipartite construction of the platform 22 with the locating of the actuators 128 and the vibration isolators between the two plate assemblies 22A-B of the platform 22, and the distribution of four of the actuators 128 and four of the vibration isolators 130 circumferentially around the shaft 120 permit fine positioning of the platform 22 with respect to the central frame 114 and the housing 24. The isolators 130 and the actuators 128 are located on a plane passing through the center of mass of the platform 22 with the optical equipment thereon so that any sudden movement of the housing, transmitted through the isolators 130, produces only a linear translation of the platform 22 without introduction of any torque about the center of mass of the platform 22 plus the optical equipment thereon. In addition, the isolators 130 attenuate high frequency components of vibratory and shock movements of the housing 24 for more precise direction of the optical equipment upon a target being viewed by the optical equipment.

In a preferred embodiment of the invention, each of the isolators 130 is constructed of a rope, or cable, of twisted metallic wires, the rope being wound in the manner of a spiral about a longitudinal axis of the isolator 130. Vibratory movement of the housing 24 introduces a deflection in the isolator 130 accompanied by elastic return to the original configuration. During the deflection of the isolator 130, the various wires, or metallic filaments, of the rope rub against each other to absorb vibrational energy and thereby damp vibrational motion of the platform 22 relative to the housing 24. Preferably, the metallic wire is stainless steel to prevent corrosion.

The longitudinal spiral configuration of the isolator 130, which may be viewed as fitting within a cylindrical envelope, facilitates the locating of the isolator 130 within the restricted amount of space available between the platform 22 and the elevation ring 86. Also, in the construction of each of the actuators 128, it is desirable to curve the base 152 and the body 158 in directions transverse to a radius of the central frame 114, as shown in both FIGS. 5 and 6, to optimize a fitting of the actuator 128 in the limited space available between the platform 22 and the elevation ring 86. The invention enables positioning of the platform 22 to very fine angular increments in the range of 10 microradians. In a preferred embodiment, the inertial measurement unit 34 employs laser ring gyros. The reduction of vibration presented to the platform 22 enables construction of the platform 22 of light-weight metal, such as aluminum, which has less stiffness than the more expensive beryllium which has been used heretofore. The location of each of the actuators 128 permits each actuator 128 to be configured with any gap size, between apertures 154, 156 and the arms of the set of crossarms 160 as may be desired for constructing the actuator 128 with a requisite torque. In a preferred embodiment of the invention, the gap size is minimized to maximize the efficiency of conversion between electric input signal power on leads 174, and the resulting torque produced between the coils 170 and the magnets 172. In particular, it is noted that the size of the gap is independent of the size of the vibration isolators 130 and other elements in the configuration of the coarse gimbal assembly. This is a distinct advantage over stabilized systems of the prior art which required much larger gap sizes. Also, the location of the actuators 128 on the aforementioned plane which passes through the center of mass of the platform 22 and electrooptical equipment thereon provides a balanced arrangement of the actuators which minimizes any cross excitation of suspension modes. Thereby, a position correction signal can be applied to an actuator 128 essentially without introduction of a rotation in an orthogonal direction which need be corrected by another of the actuators 128.

It is anticipated that the suspension system of the absorbers 130, and the resultant softer ride as compared to gimbal mounts of the prior art, will result in longer hours of operation of the electrooptical equipment and the gyros without equipment breakdown or failure. It is to be understood that, while the invention has been described with respect to an embodiment of four actuators and four isolators, an arrangement of three actuators (not shown) may be employed with the actuators being symmetrically positioned about the shaft 120 and with the isolators connected between the actuators and the elevation ring 86. In such case, the yaw and pitch signals would be broken up into vectorial components corresponding to the 120 degree positioning of the actuators about the shaft 120. Alternatively, five, six, or more actuators may be employed with a corresponding number of isolators symmetrically positioned about the shaft 120. It is noted also that the spiral configuration of the isolators enables each isolator to present three degrees of freedom of linear movement, namely, vertical along the azimuthal axis 74, horizontal along the axis of the shaft 120, and lateral in a direction perpendicular to a plane defined by the vertical and horizontal motions. Also, it is noted that, in the locations of the autocollimator mirrors 108 and 110, attachment of these mirrors to the housing 24 provides for orienting the mirrors perpendicularly to the optical axis of an autocollimator to accommodate for translational travel of the isolated platform 22, the translational travel occurring during deflection of the isolators 130.

By virtue of the foregoing construction of the stabilized gimbal system of the invention, electrooptical equipment and gyros carried by a stabilized platform are provided with a softer suspension and with a more precise and accurate orientation independent of the vehicular motion.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A gimbal vibration isolation system comprising;
    a gimbal housing including a drive ring rotatable about a central axis perpendicular to a plane of the ring;
    a platform comprising a first plate assembly and a second plate assembly opposing, and spaced apart from, said first plate assembly;
    a plurality of actuators and a plurality of vibration isolators positioned symmetrically about said central axis, each of said actuators extending along a radius of said drive ring and having a first part and a second part movable relative to said first part;
    a frame assembly encircled by said drive ring and located between said first plate assembly and said second plate assembly, said frame assembly including a central frame, said first parts of said actuators and corresponding ones of said isolators being serially connected between said frame and said drive ring, said second pads of respective ones of said actuators being connected with said platform; and
    a pivot assembly having at least one pivot and a shaft extending through said pivot, said shaft connecting with said first and second plate assemblies, said at least one pivot being located on said frame and coaxial to said drive ring to enable a pivoting of said platform in response to an activation of said actuators.

2. A system according to claim 1 wherein at least three of said actuators are provided for pivoting said platform in at least two orthogonal directions of pivot.

3. A system according to claim 2 wherein each of said actuators includes motion means for imparting relative motion between said first part and said second part.

4. A system according to claim 3 wherein each of said actuators is electrically activated, and said motion means comprises a cross coil assembly and a plurality of permanent magnets for imparting said relative motion between said first part and said second part.

5. A system according to claim 1 wherein each of said vibration isolators comprises resilient material.

6. A system according to claim 5 wherein each of said vibration isolators has a spiral configuration.

7. A system according to claim 6 wherein said resilient material is metallic wire, and each of said vibration isolators includes a twisted metallic wire rope, the rope having said spiral configuration, an axis of said spiral rope being directed in a circumferential direction about said central axis.

8. A system according to claim 7 wherein each of said plurality of isolators has opposing ends, and for said each isolator, said ends are connected to said drive ring and to a corresponding one of said actuators.

9. A system according to claim 1 wherein at least four of said actuators are provided for pivoting said platform in at least four orthogonal directions of pivot, and wherein each one of said actuators includes motion means for imparting relative motion between said first part and said second part.

10. A system according to claim 9 wherein said second part of each one of said actuators bridges across from said first plate assembly to said second plate assembly of said platform.

11. A system according to claim 8 wherein said at least one pivot comprises a ball bearing assembly having a raceway configured as a portion of a sphere to permit pivoting in orthogonal directions.

* * * * *